United States Patent [19]

Kies

[11] Patent Number: 4,577,053

[45] Date of Patent: Mar. 18, 1986

[54] GROUND ROD

[76] Inventor: Anton M. Kies, Oranjelaan 8, 5062 KA Oisterwijk, Netherlands

[21] Appl. No.: 585,529

[22] Filed: Mar. 2, 1984

[51] Int. Cl.⁴ .......................... H01R 4/66; F16B 7/18; B21D 39/04

[52] U.S. Cl. .......................................... 174/7; 29/523; 403/305; 403/307

[58] Field of Search ....................... 174/7, 94 R, 94 S; 16/108, 109; 29/523; 138/143; 285/329, 382.4; 403/274, 305, 307

[56] References Cited

U.S. PATENT DOCUMENTS

| | | | |
|---|---|---|---|
| 814,491 | 3/1906 | Westerman | 138/143 X |
| 2,186,482 | 1/1940 | Frank | 403/307 |
| 3,100,930 | 8/1963 | Nihlen et al. | 29/523 X |
| 3,193,858 | 7/1965 | Kahn | 29/523 X |
| 3,716,649 | 2/1973 | Smith et al. | 403/305 X |
| 4,300,275 | 11/1981 | McLaughlin | 29/523 X |

FOREIGN PATENT DOCUMENTS

| | | | |
|---|---|---|---|
| 473618 | 5/1951 | Canada | 174/7 |
| 1045427 | 10/1966 | United Kingdom | 138/143 |

*Primary Examiner*—Laramie E. Askin

[57] ABSTRACT

A ground rod, coupling therefor and method of making that coupling are disclosed providing both strength and improved conductivity. Ground rods are usually copper coated or plated steel rods formed in sections which are driven or, perhaps more correctly, pounded into the ground to form grounding or earthing connections for dissipation of electrical current into the earth. The coupling includes co-extensive inner and outer sleeves of copper and a corrosion resistant metal such as stainless steel, respectively, which are mechanically interlocked along their axial lengths. The inner copper sleeve is formed with threads or oppositely directed cones after the two sleeves are interlocked and in so doing the interlock between the sleeves is enhanced. If the connection of the coupling to the rod is threaded or a simple cone friction fit, the connection and/or driving of the rod sections yet further works the internal copper sleeve enhancing both copper-to-copper electrical conductivity and the interlock of the inner and outer sleeves.

16 Claims, 6 Drawing Figures

Fig. 1
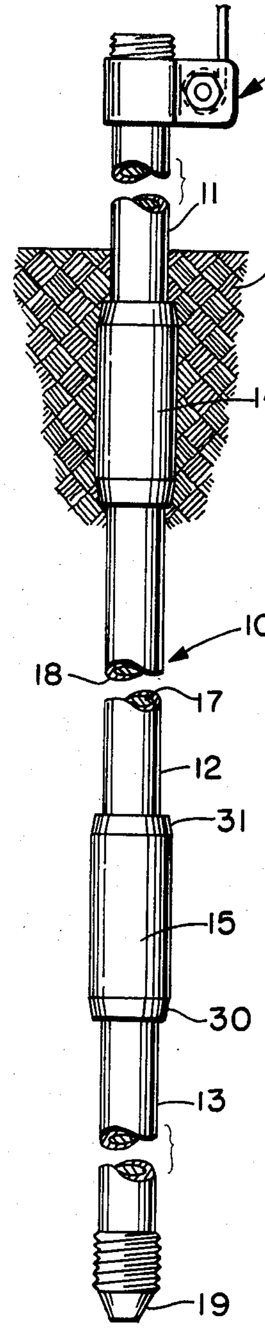
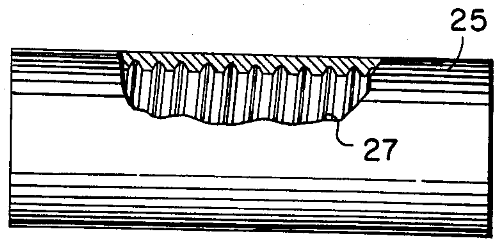
Fig. 2
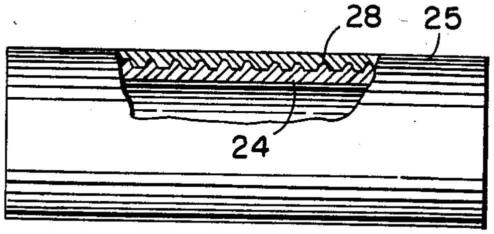
Fig. 3
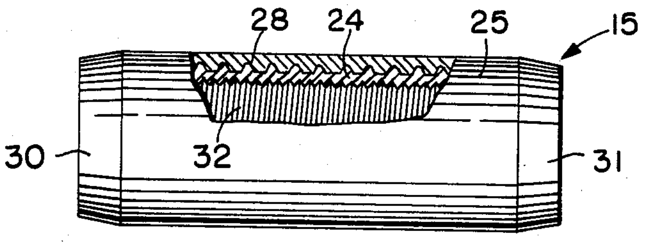
Fig. 4
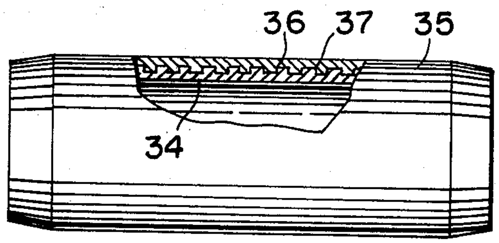
Fig. 5
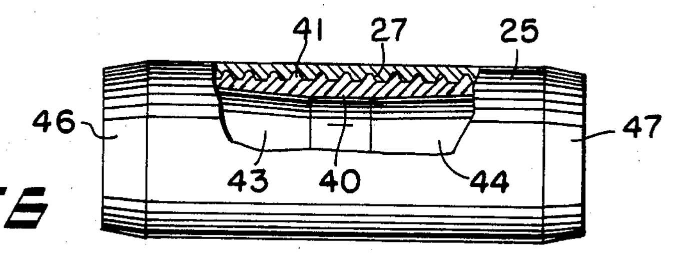
Fig. 6

GROUND RODThis invention relates generally as indicated to a ground rod, coupling therefor, and method of making such coupling.

BACKGROUND OF THE INVENTION

Ground rods or electrodes are widely used in many applications and usually comprise interconnected sections of copper jacketed, coated or plated steel rod which are coupled together and driven into the ground. Conventionally, such rods come in sections and are literally pounded into the earth or ground with sections being added as the rod moves into the earth. Ground rods are inserted in much the same manner as pilings and are thus subjected to considerable abuse in the insertion process. In a ground rod assembly, the coupling is normally the point of highest electrical resistance.

In conventional threaded couplings, bronze or brass coupling sleeves are employed which are internally threaded. Such sleeves are normally made from either bar stock or heavy-walled tubular stock and are quite expensive. More importantly, the materials employed in such couplings or fittings do not provide good conductivity from one rod section to another.

It is accordingly desirable to provide a ground rod assembly and coupling therefor which incorporates the high conductivity or low resistance of copper and which also has strength and corrosion resistance.

It is also desirable that such a coupling be capable of manufacture in an inexpensive and convenient manner.

SUMMARY OF THE INVENTION

The present invention provides a ground rod assembly, coupling therefor, and method of making that coupling providing not only strength and improved conductivity, but also corrosion resistance. The coupling includes co-extensive inner and outer sleeves of a malleable conductive metal, such as copper, and a high strength corrosion resistant metal such as stainless steel, respectively, which are mechanically interlocked along their axial lengths. The inside surface of the inner or malleable metal conductive copper sleeve is formed with threads or oppositely directed cones after the two sleeves are interlocked and in so doing the interlock between the sleeves is enhanced.

The initial sleeve-to-sleeve interlock may be formed by cutting a spiral or helical groove on the interior of the outer metal sleeve, and then expanding the inner metal sleeve thereinto. Alternatively, the outer sleeve may be provided with internal annular recesses, deformations or rings into which the inner sleeve is expanded or pressed. The inner copper or malleable sleeve is formed with threads or oppositely directed cones after the two sleeves are interlocked and, as indicated in so doing the interlock between the sleeves is enhanced. If the connection of the coupling is threaded or a simple cone friction fit, the connection and/or driving of the rod sections yet further works the internal malleable metal copper sleeve enhancing both rod to coupler electrical conductivity and the interlock of the inner and outer sleeves of the coupler.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a view of a rod assembly in accordance with the present invention driven into the ground or earth;

FIG. 2 is a side elevation partially broken away and in section illustrating the outer sleeve of a preferred form of the coupling with deformations formed on the internal diameter thereof by forming a thread therein with a relatively large pitch;

FIG. 3 is a similar view illustrating a copper or malleable conductive metal sleeve inserted therein and expanded to flow into the deformations thus formed on the interior of the outer sleeve;

FIG. 4 is a similar view of the coupling after threads have been formed on the interior of the interior sleeve further forcing the malleable metal of the interior sleeve into the deformations of the outer sleeve;

FIG. 5 is a view similar to FIG. 3 but illustrating a different form of deformation on the interior of the outer sleeve; and FIG. 6 is a similar illustration of a sleeve utilizing oppositely directed conical surfaces on the interior sleeve which simply fit over similar surface juxtaposed rod section ends.

DETAILED DESCRIPTION OF THE DRAWING

Referring first to FIG. 1, there is illustrated a ground rod assembly 10 which comprises a plurality of rod elements 11, 12 and 13 connected end to end by couplings shown generally at 14 and 15. As illustrated, each ground rod section may comprise a steel core 17 and a copper jacket or coating 18. The lowermost rod element 13 is provided with a relatively blunt point indicated at 19 while the uppermost rod element 11 is provided with electrical connection 20.

Initially, the lowermost rod element 13 is driven into the ground 22, after which with the aid of coupler 15 the next rod 12 is connected to the lower rod and both are then driven further into the ground. Then again, with the aid of the coupler 14 the further rod 11 is connected to the rod 12 and the driving of the electrode continues. In this manner, the rod elements are coupled one to another and inserted into the ground 22 to the desired depth.

Referring now to FIGS. 2–4, it will be seen that the preferred form of coupler comprises co-extensive composite inner and outer sleeves 24 and 25. The inner sleeve 24 is formed of a conductive malleable metal such as copper while the outer sleeve 25 is a corrosion resistant high strength metal such as stainless steel.

In the manufacture of the coupling of FIG. 4, the outer tube or sleeve 25 and the inner copper tube or sleeve 24 are cut to the same length. The interior of the outer tube or sleeve 25 is then formed with an interior thread with a fairly large pitch as indicated at 27. The thread cutting tool may be provided with a slight radius or flat at its tip to avoid the creation of stress risers. In this manner a series of indentations or deformations are formed in the interior of the outer tube along and preferably throughout its length. The malleable metal or copper tube 24 is then inserted into the outer tube 25 as seen in FIG. 3 and expanded as by pressing, swaging, rolling, mandrel expansion, or interior working. This causes the material of the inner sleeve to cold flow into the thread formations 27 on the interior of the outer tube or sleeve as indicated at 28 in FIG. 3.

Next the ends of the outer tube or sleeve are chamfered as indicated at 30 and 31 and the interior of the copper sleeve is formed with a thread indicated at 32 with a forcing tap. The forcing tap further enhances the cold flow of the metal of the interior sleeve into the thread formations 27. The ends of the rods 12, 13 etc. are provided with a mating thread so that the rod coupling may quickly be inserted on the end of the lower rod with the upper rod then being tightened into the upwardly extending threaded socket formed by the coupler. When the rods are thus tightened and in abutment with each other, the malleable metal of the inner sleeve will again be caused further to cold flow ensuring the interlock of the two sleeves of the coupling and also ensuring intimate contact between the inner copper or malleable conductive sleeve and the copper jacket or coating of the rods. The driving and tightening during driving further enhances the strengh and conductivity of the connection.

In FIG. 5 there is illustrated another form of coupler in accordance with the present invention which includes an inner copper or the like sleeve 34 and an outer corrosion resistant metal sleeve 35. The coupler of FIG. 5 is illustrated after the two sleeves have been interlocked by expanding the inner sleeve into the outer sleeve but before the formation of threads on the interior of the inner sleeve. The interlock is provided by a series of annular grooves 36 which may have rediused interior corners indicated at 37. Again, such grooves are provided substantially throughout the co-extensive length of the two sleeves to provide the mechanical interlock.

In FIG. 6 there is illustrated another form of coupling wherein the outer corrosion resistant metal tube or sleeve 25 is the same as seen in FIG. 3. The interior of the outer tube 25 may be provided with the same relatively large pitch thread formation 27 on the interior threrof. A slightly smaller copper or conductive malleable metal tube 40 is then inserted into the tube 25 and is expanded to cause the metal of the tube to flow into the thread formations 27 as indicated at 41. This again may be done by swaging, pressing, rolling, mandrel expansion, or interior working of the malleable metal tube 40. After the initial expansion of the tube 40, it may be worked again to form outwardly flaring conical end sections 43 and 44, such further working further enhancing the flow of the malleable conductive metal into the indentations or recesses formed along the interior of the outer sleeve 25. Finally the coupling may be chamfered both inside and out, the latter being illustrated at 46 and 47.

It will be appreciated that the interlocking of the two sleeves is provided by deformations or recesses on the interior of the outer sleeve, and that such recesses may be continuous, discontinuous, in the form of a helix or in the form of annular grooves.

In operation the coupling of FIG. 6 is simply fitted over the conical ends on ground rods, such couplings maintaining the rods in alignment as they are driven into the earth.

In any event, the various forms of couplers illustrated allow good contact of rod end to rod end and low resistance copper-to-copper connections.

I claim:

1. In combination, a ground rod comprising sections of copper jacketed steel rod, a coupling holding said sections in end-to-end relationship, said coupling comprising an outer sleeve of high strength corrosion resistant alloy metal and an inner sleeve of a malleable conductive metal, and means mechanically interlocking said sleeves along their co-extensive lengths, said means comprising closely spaced deformations on the interior of said corrosion resistant sleeve, said conductive metal sleeve being expanded into said deformations.

2. The combination set forth in claim 1 wherein said deformations comprise a helical thread form groove cut into the interior of said corrosion resistant sleeve.

3. The combination as set forth in claim 2 wherein said helical thread form groove includes a tip with a slight radius.

4. The combination as set forth in claim 2 wherein said helical thread form groove includes a tip which is flat.

5. The combination set forth in claim 1 wherein said deformations comprise a plurality of annular grooves cut into the interior of said corrosion resistant sleeve.

6. The comnbination as set forth in claim 5 wherein said plurality of annular grooves include radiused interior corners.

7. The combination set forth in claim 1 wherein said outer sleeve is stainless steel and said inner sleeve is copper.

8. The combination set forth in claim 1 including a thread on the interior of said inner sleeve engaging threaded rod ends.

9. The combination set forth in claim 1 including opposite outwardly flaring conical surfaces on said inner sleeve engaging conical rod ends.

10. The combination as set forth in claim 1 wherein said outer sleeve is stainless steel.

11. The combination as set forth in claim 1 wherein said inner sleeve is copper.

12. The combination as set forth in claim 1 wherein said inner sleeve includes a continuous thread form helical groove cut into the I.D. of said inner sleeve.

13. The combination as set forth in claim 1 wherein said inner sleeve and said outer sleeve are of equal length and coextensive.

14. The combination as set forth in claim 1 wherein said outer sleeve includes at least one end with a chamfered O.D.

15. The combination as set forth in claim 1 wherein at least one section of said copper jacketed steel rods includes at least one end with a relatively blunt point.

16. The combination as set forth in claim 1 wherein at least one section of said copper jacketed steel rods includes at least one end with a continuous mating thread form helical groove cut into the O.D. of said copper jacketed steel rod.

* * * * *